Dec. 26, 1961 L. M. BUMM ETAL 3,014,327
HAY CONDITIONER
Filed Dec. 11, 1959 6 Sheets-Sheet 4

INVENTORS
LEONARD M. BUMM
EMMETT F. GLASS &
HORACE G. McCARTY
By Joseph A. Brown
ATTORNEY

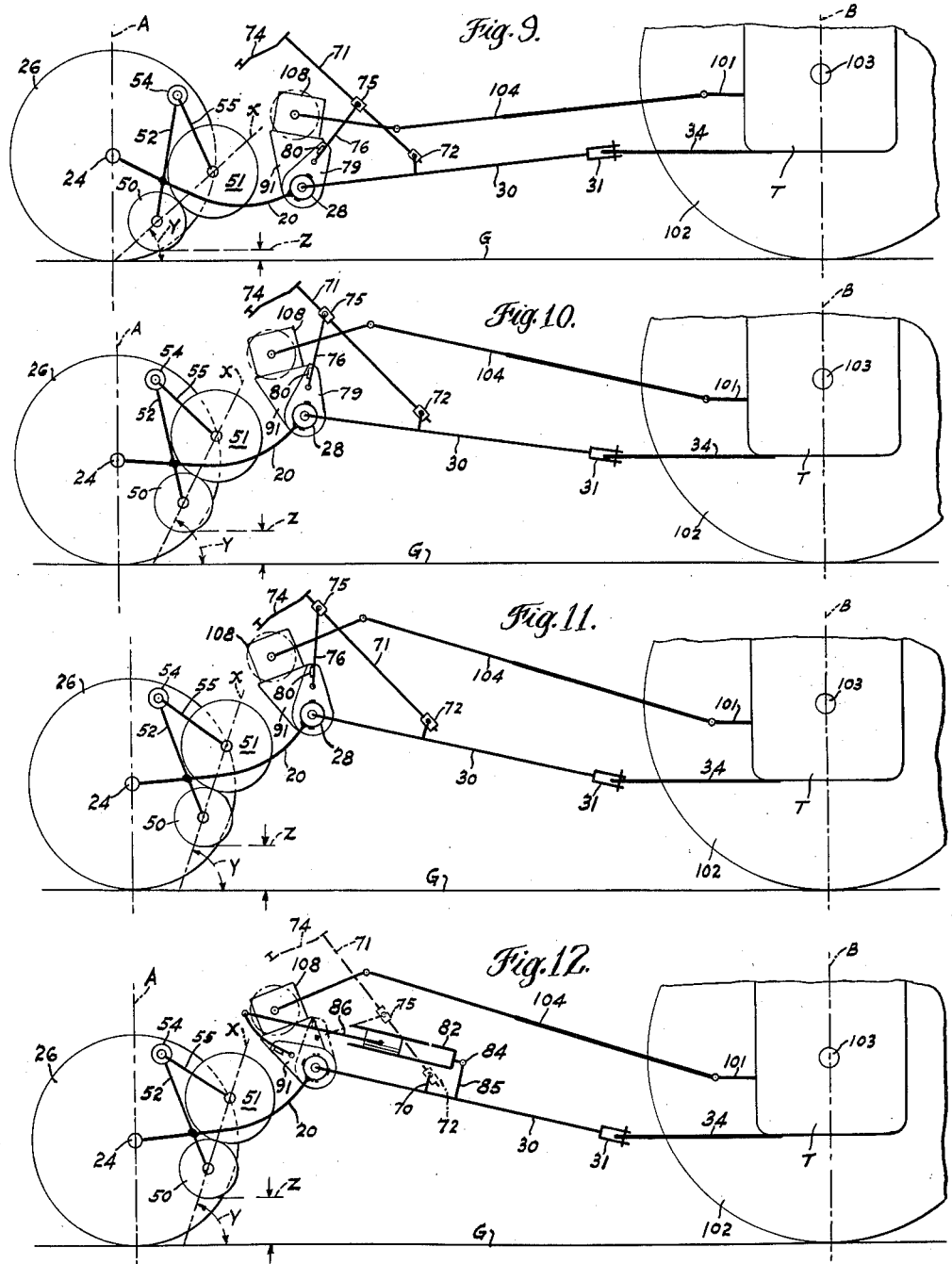

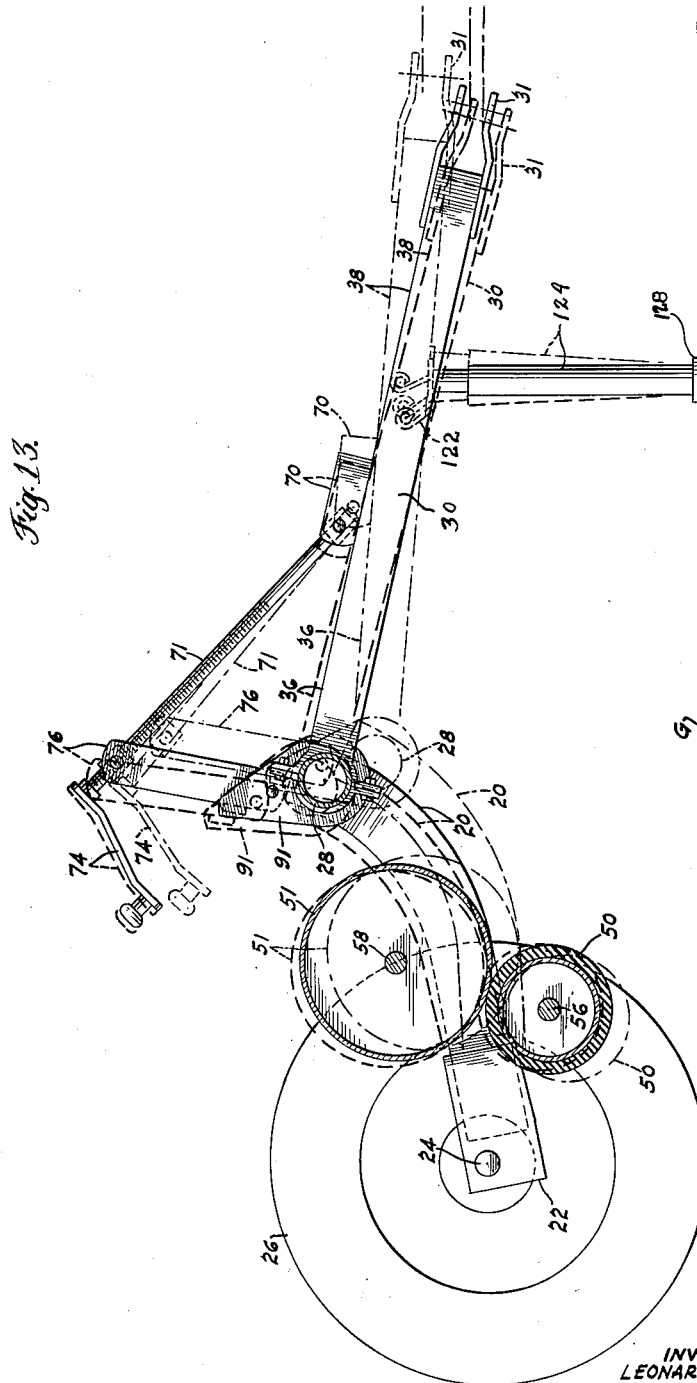

December 26, 1961

United States Patent Office 3,014,327
Patented Dec. 26, 1961

3,014,327
HAY CONDITIONER
Leonard M. Bumm, Blue Ball, Emmett F. Glass, Akron, and Horace G. McCarty, New Holland, Pa., assignors to Sperry Rand Corporation, New Holland, Pa., a corporation of Delaware
Filed Dec. 11, 1959, Ser. No. 859,046
12 Claims. (Cl. 56—1)

The present invention relates generally to agricultural machinery and more particularly to crop conditioners for crushing or cracking the stems of previously cut crop material to facilitate drying. More specifically, the invention relates to a versatile lift system for a hay crusher.

It has become conventional in the hay conditioner art to provide crop treating rolls mounted one above the other, the lower roll serving the dual function of a pick-up and crusher element. The upper roll is displaced forwardly of the lower roll whereby a plane through the axes of the rolls forms an acute angle with the ground on the material engaging side of the rolls.

When a hay conditioner is operated, the proper spacing between the lower roll and the ground depends on field conditions and the nature of the crop being treated. Generally, when the cut crop is light and rests upon the stubble in a thin mat, it is necessary to position the lower roll close to the ground so that all material will be picked up. If the crop is heavy, the lower roll should be more elevated. Further, it has been found that the greater the spacing between the lower roll and the ground, the less the upper roll should be displaced forwardly of the lower roll. In light material, the upper roll should project well forwardly of the lower roll to provide an overlying "live" surface against which the lower roll can sweep the crop material. In heavy material, the upper roll should be considerably retracted so that it will not engage the material on the ground until such material has been engaged by the pick-up roll and lifted so that the material will pass between both rolls.

One object of this invention is to provide a versatile lift system in a hay conditioner of the character described whereby a lower roll can be adjusted vertically relative to the ground and at the same time an upper roll will be adjusted and its position relative to the lower roll varied.

Another object of this invention is to provide a versatile lift system in a hay conditioner of the character described whereby the angle of incidence formed by a plane between the axis of a pair of cooperative conditioning rolls and the ground is varied as the space between the lower roll and the ground is changed.

Another object of this invention is to provide a lift system of the character described having manually operable means for establishing the lower limit of adjustment of a lower conditioning roll and having quick acting hydraulic means for adjusting the lower roll upwardly from such lower limit.

Another further object of this invention is to provide a crusher lift system whereby the position of a lower roll relative to the ground is infinitely variable between maximum and minimum points.

A further object of this invention is to provide a lift system having both manual and hydraulic control means thereon selectively useable at the option of the operator.

A further object of this invention is to provide a lift system which can be controlled while the machine is being operated in the field and without requiring the operator to leave the tractor towing the implement.

A still further object of this invention is to provide a lift system wherein a means for raising and lowering a crop conditioner relative to the ground is also useable for setting the height of a hitch member for connection to a drawbar.

A still further object of this invention is to provide a lift system of the character described which is of such construction that it can be manufactured, sold and kept in operative condition at moderate cost.

Other objects of this invention will be apparent hereinafter from the specification and from the recital in the appended claims.

In the drawings:

FIGS. 9–11 are diagrammatic side views showing the lower roll in its lowermost position (FIG. 9), in an intermediate position (FIG. 10) and with the lower roll at maximum elevation or road transport position (FIG. 11). FIGS. 9 and 11 correspond to FIGS. 1 and 3, respectively;

FIG. 12 is a diagrammatic view showing the manual control means adjusted to its lowermost position while the hydraulic means has elevated the crop conditioning rolls to a point of maximum elevation; and FIG. 13 is a generally diagrammatic side elevation showing the lift system utilized with the jack stand to adjust the vertical height of the hitch at the forward end of the machine.

Figure 1:
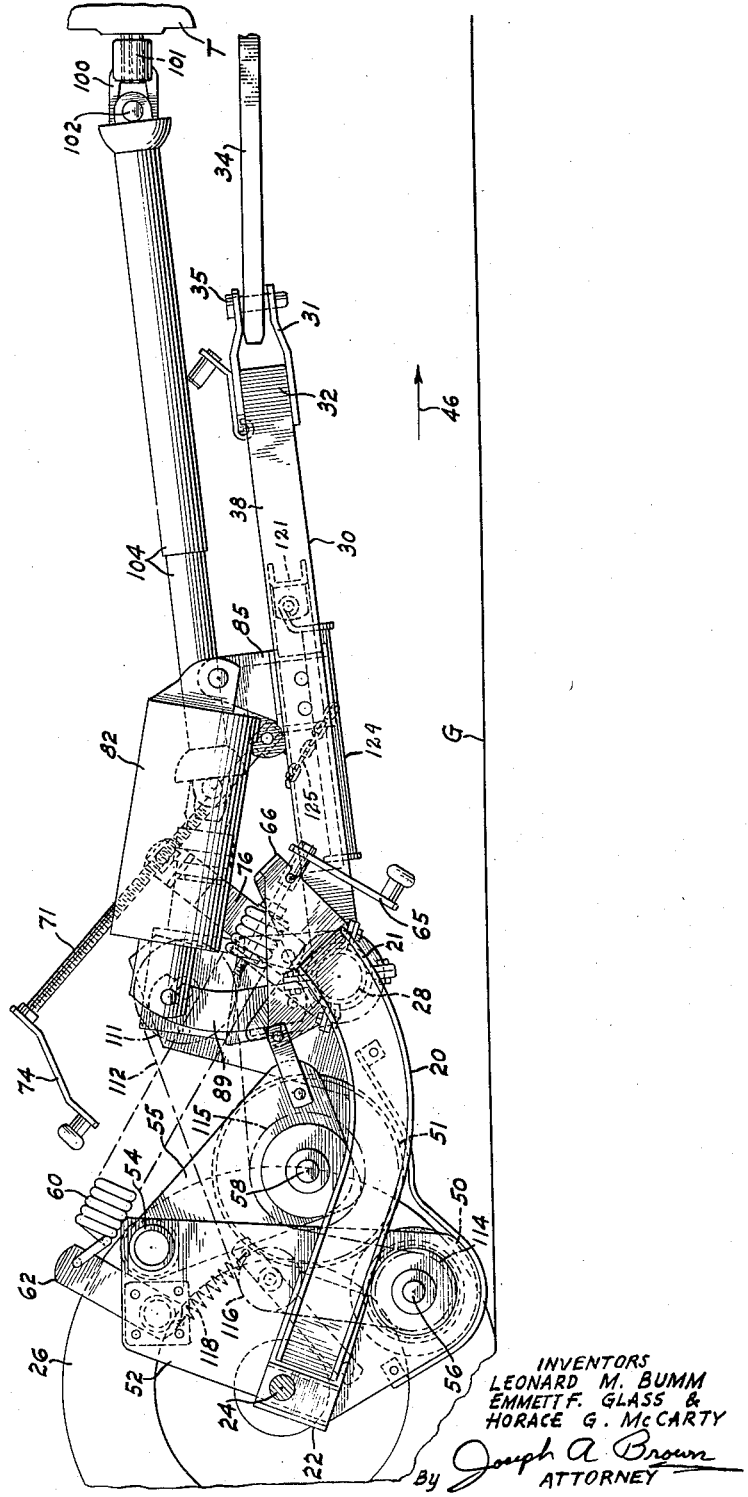
FIG. 1 is a side elevation of a hay conditioner provided with a lift system constructed according to this invention and showing the conditioner with one wheel removed and with a lower roll in a lowermost operating position.
Figure 2:
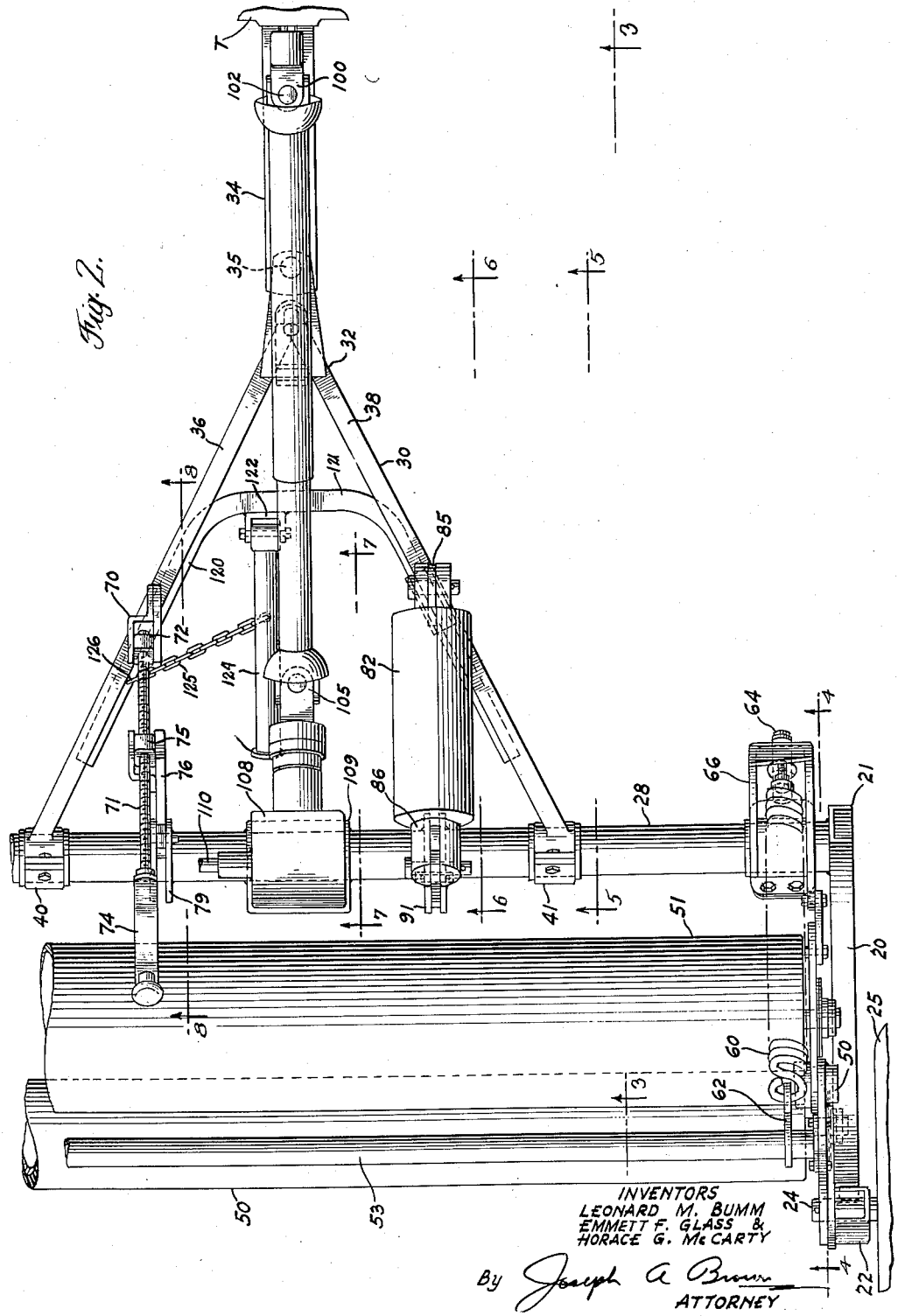
FIG. 2 is a fragmentary plan view of FIG. 1.

Referring now to the drawings by numerals of reference, and particularly to FIGS. 1 and 2, 20 denotes laterally spaced, fore-and-aft extending frame members having forward ends 21 and rear ends 22. The rear ends of the frame members support spindles 24 for right and lefthand ground wheels 25 and 26, respectively. The forward ends 21 of the frame members are interconnected by a cross member 28 whose ends are welded to the respective frame members.

Projecting forwardly from cross member 28 is a tongue 30 having a hitch member 31 at a forward end 32 adapted to be connected to the drawbar 34 of a tractor T by a hitch pin 35. Tongue 30 has legs 36 and 38 which extend rearwardly from the hitch member and diverge laterally. The rear ends 40 and 41 of legs 36 and 38, respectively, are pivotally connected to the cross member 28. Each pivotal connection is constructed as shown best in FIG. 5 and comprises mating semi-circular sections 42 and 44 having ears 45 fastened together by bolts 46.

Rotatably mounted on the frame members 20 and extending transversely relative to the direction of travel of the machine, indicated by the arrow 46 in FIG. 1, are crop conditioning rolls namely, lower roll 50 and upper roll 51. As shown, the lower roll is of considerably smaller diameter than the upper roll. Roll 50 is journalled in the lower portions of vertically extending side plates 52 welded to the frame members 20 and extending above and below such members. The lower roll is made of rubber or the like to provide a cylindrical surface which has considerable friction so that the crop material engaged on the ground G will be aggressively contacted by the surface of the rotating roll and picked up. The upper portions of the side plates 52 are interconnected by a cross-pipe 53 to provide frame strength for the structure. Connected to plates 52 just forwardly of cross-pipe 53 are members 54 which pivotally support plates 55.

Plates 55 extend downwardly and forwardly from the members 54 and rotatably support the upper roll 51. The stub shafts 56 and 58 of the lower roll and upper rolls 50 and 51, respectively, provide axes which are spaced in a fore-and-aft direction. A plane through the axes of the rolls forms an acute angle with the ground directed forwardly or on the material engaging side of the rolls. As a result, crop material engaged by the rolls during operation of the machine passes under the upper roll 51 and into engagement with lower roll 50. With the lower roll rotating counterclockwise when viewed as shown in FIG. 1 and with the upper roll rotating clockwise, the lower roll acts to pick up the material and pass it between the rolls so that it will be crushed. Thereafter, the material is deposited rearwardly and onto the ground where it will dry faster because of the crushing or conditioning to which it was subjected.

The weight of the upper roll and its mounting relative to the lower roll tends to hold the upper roll in engagement with the lower roll. However, the material passing between the crushing rolls will vary in volume and the upper roll must be free to swing away from the lower roll about the axis of its support members 54. To provide a substantial hold down effect on the upper roll a heavy tension spring 60 is provided at each end of the machine. Each such spring (FIG. 4) has an end 61 connected to an arm 62 fastened to the adjacent end of cross-pipe 53. The opposite end 63 of the spring is connected through initial load adjustment means 64 including crank member 65 to a U-shaped lever arm 66 pivotally connected at 68 to the cross member 28. The pivotal connection at 68 is similar to the connection shown in FIG. 5. Each support plate 55 and its associated lever 66 are interconnected by a link 69, the respective ends of the link being connected to these members by suitable pivotal means.

Figure 4:
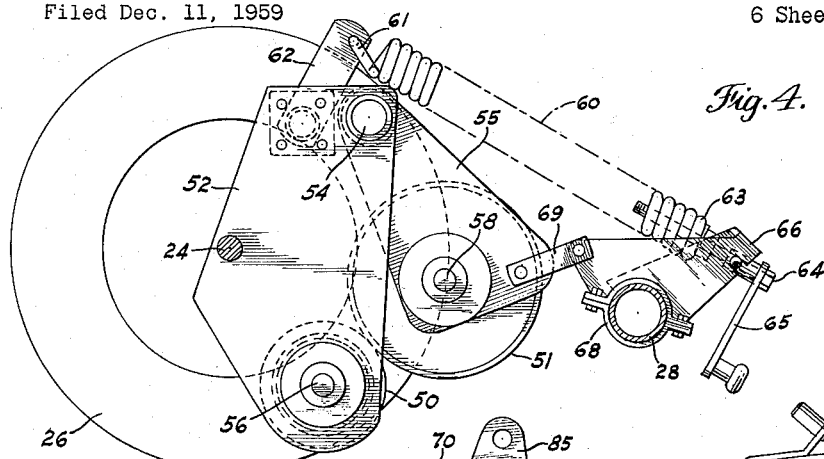
FIG. 4 is a section taken on the line 4—4 of FIG. 2 looking in the direction of the arrows and showing the constant pressure control means for the upper roll of the conditioner.

Upon viewing FIG. 4, it will be seen that if the upper roll moves away from the lower roll it will swing about the axis of the member 54 thereby producing a toggle action between 55 and 69 and imparting a forward movement to link 69 which will cause the lever 66 to be pivoted in a clockwise direction (FIG. 4) to thereby extend the spring 60. The extension of the spring 60 resists movement of the upper roll for a given distance. Each link 69 is related to its associated plate 55 and lever 66 so that the pressure on roll 51 is relatively constant for a given movement of the upper roll. Thereafter, the resistance drops off. More specifically, the pressure means is such that the pressure on roll 51 remains about constant from a zero to a one and a half inch roll spacing. Thereafter the pressure on the upper roll will progressively drop off.

While the lower roll 50 is made of rubber, the upper roll 51 is made of steel. The resiliency of the lower roll prevents shattering of the leaves of the crop material passing between the rolls, while the hard surface of the upper roll provides the necessary crushing action. Thus, the crop material while properly crushed is not shattered.

The position of the lower roll 50 relative to the ground G when the machine is operating should be adjusted according to the crop material being treated, the condition of such material and the condition of the ground. In operating the machine, the operator should position the lower roll where optimum operating characteristics are achieved. When the lower roll is vertically adjusted relative to the ground the position of the upper roll relative thereto should also be changed. Specifically, when the lower roll is close to the ground it is desirable to have the upper roll substantially forwardly of the lower roll so that it dominates the infeed of material and provides a considerable "live" surface above the material to assist in the feeding action. However, when the crop material is heavy and the lower roll is vertically adjusted, better operating characteristics are achieved if the upper roll is displaced more rearwardly. To achieve this end, mechanical and hydraulic adjustment means are interconnected between the tongue and the frame of the implement to produce a scissor-like action and adjust and pivot the tongue 30 and frame members 20 relative to each other about the axis of the cross member 28.

Figure 3:
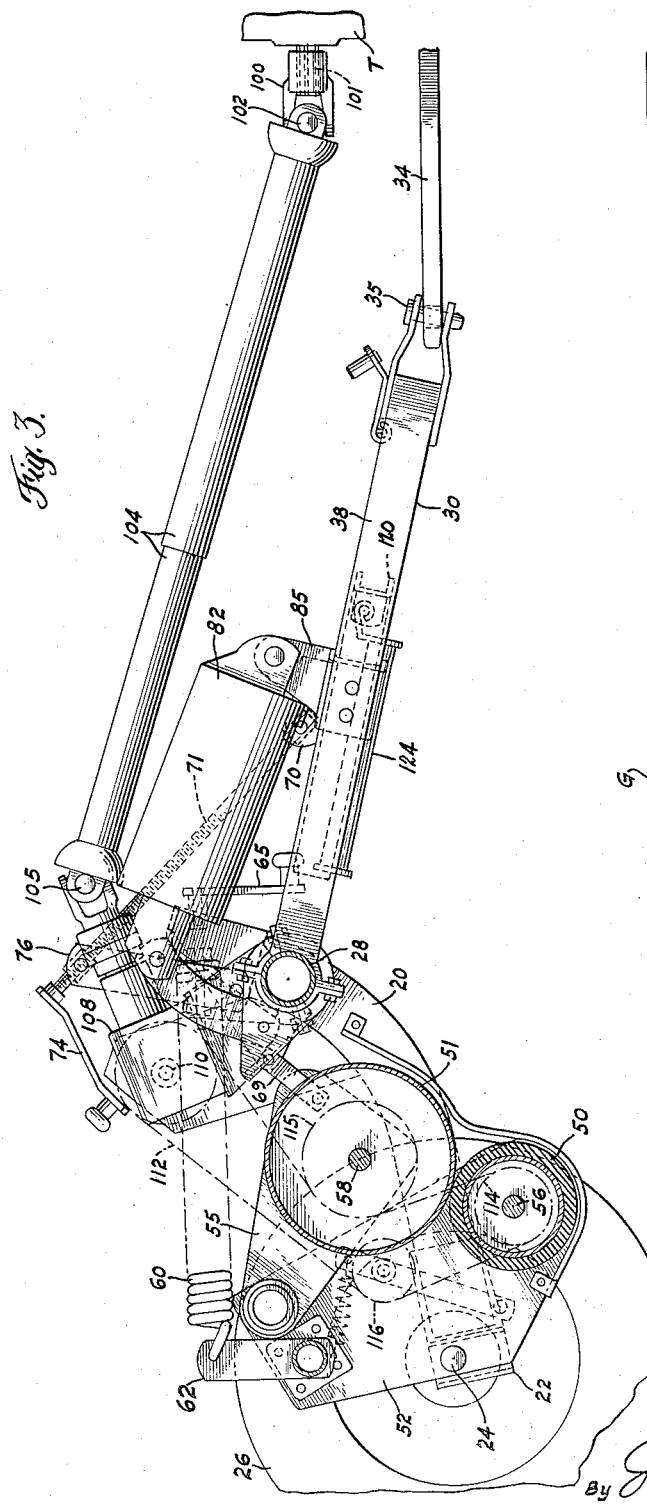
FIG. 3 is a section taken on the line 3—3 of FIG. 2 looking in the direction of the arrows and showing the lower crusher roll adjusted to its maximum ground clearance position.
Figure 8:
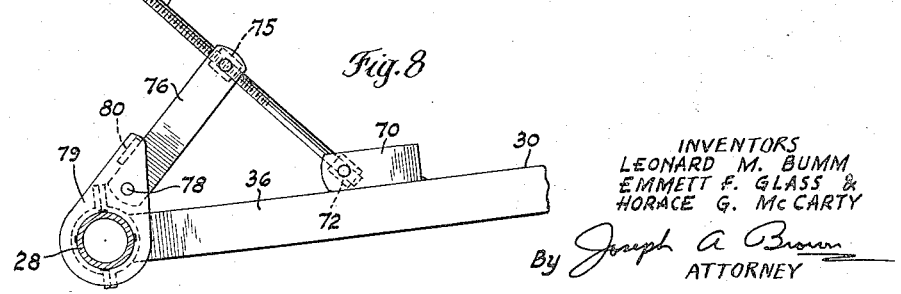
FIG. 8 is a fragmentary section taken on the line 8—8 of FIG. 2 looking in the direction of the arrows and showing the manual control means of the lift system for raising and lowering the crusher rolls.

The mechanical means provided is shown best in FIGS. 2 and 8. Mounted on the leg 36 of tongue 30 is an anchor member 70 having a lower end of a rod 71 pivotally connected to it at 72. The upper end of the rod carries a crank handle 74. The pivotal connection at 72 is such as to permit rotation of rod 71. As shown, rod 71 is threaded for the major portion of its length. Threaded onto the rod is a sleeve 75 carried on the upper end of a lever arm 76 and pivotally connected thereto. The lower end of the lever arm 76 is pivotally connected at 78 to a pivot plate 79 affixed by welding or the like to the cross member 28. Plate 79 has a stop member 80 thereon engageable with one side edge of lever arm 76. Stop member 80 provides a lost-motion connection between lever arm 76 and plate 79. When the crank handle 74 is rotated, rod 71 is simultaneously rotated causing the sleeve 75 to thread axially up or down the rod depending on the direction of rotation of the rod. As the sleeve 75 moves up or down rod 71, lever 76 is pivoted about the axis of cross-member 28. When the lever arm is pivoted in a counterclockwise direction from the position shown in FIG. 8, a scissoring or pivoting action is produced between the members 20 of the implement frame and the tongue 30. The frame and tongue may be moved from the position shown in FIGS. 1 and 9 to the position shown in FIGS. 3 and 11 or any position therebetween such as the position shown in FIG. 10.

Figure 6:
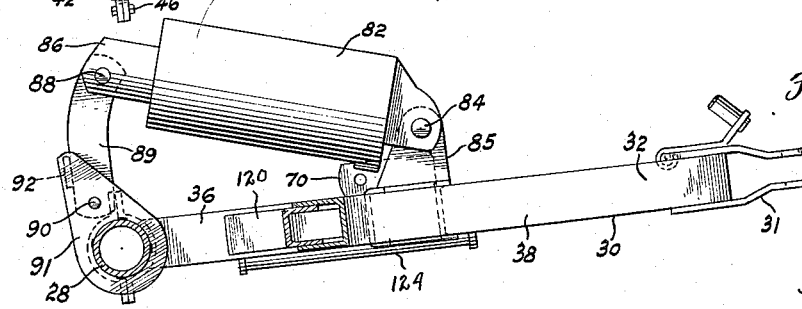
FIG. 6 is a section taken on the line 6—6 of FIG. 2 looking in the direction of the arrows and showing the hydraulic means provided in the lift system for raising and lowering the rolls.

For achieving the same scissoring or pivoting action, a hydraulic cylinder 82 is provided as shown best in FIGS. 2 and 6. One end of the hydraulic cylinder is pivotally connected at 84 to an anchor member 85 carried on the leg 38 of the tongue 30. The hydraulic cylinder has an outwardly and rearwardly projecting piston rod 86 pivotally connected at 88 to a lever arm 89 pivotally connected at 90 to a pivot plate 91. Plate 91 is welded to cross member 28. It is identical with pivot plate 79 and in angular register therewith. A stop 92 is provided on plate 91 to provide a lost-motion connection between lever arm 89 and plate 91. Therefore, it will be apparent that if the piston rod 86 is extended outwardly of the cylinder 82 the lever arm 89 will be swung rearwardly about the axis of cross-member 28 and against the stop 92 thereby producing a scissoring action of the frame 20 relative to the tongue 30.

Figure 7:
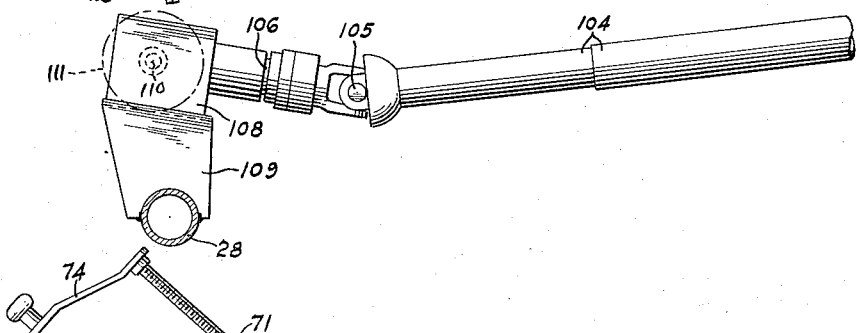
FIG. 7 is a section taken on the line 7—7 of FIG. 2 looking in the direction of the arrows and showing the power drive means for the implement.

Regardless of the adjusted position of the crusher rolls, it is necessary that power be supplied to them so that they will rotate in opposite directions. To this end, a power train is provided comprising a conventional quick coupler 100 connected to the splined output shaft 101 of a tractor T having wheels 102 resting on the ground. The wheels are rotatable about the axis 103. Coupler 100 connects to a universal joint 102 which is connected to drive shafts not shown within telescopic housing members 104. Such shaft members terminate in a universal 105 (FIG. 7) connected to the input shaft 106 of a gear box 108. The gear box 108 is carried on a pedestal 109 extending upwardly from the cross member 28. Gear box 108 has an output shaft 110 which drives a sprocket 111 (FIGS. 1 and 7) at the lefthand side of the machine and around which an endless chain 112 extends. Rolls 50 and 51 have drive sprockets 114 and 115, respectively, which are driven by the endless chain 112. The endless chain extends around the drive sprocket 114 and engages the sprocket 115. A chain tightener 116 biased by the spring 118 holds the chain under proper tension. The drive to the respective rolls is such that the upper roll rotates clockwise when viewed as shown in FIG. 1 and the lower roll rotates counterclockwise.

Figure 5:
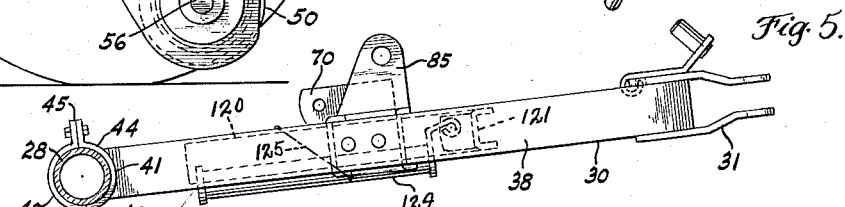
FIG. 5 is a section taken on the line 5—5 of FIG. 2 looking in the direction of the arrows showing the tongue of the implement and the retracted jack stand mounted thereon.

Connected between the legs 36 and 38 of the tongue 30 is a U-shaped brace member 120, shown best in FIG. 2. The bight 121 of this member is disposed adjacent the forward end of the tongue. Connected to member 120 is a bracket 122 to which the upper end of a jack stand 124 is attached. The jack stand is held in retracted position as shown in FIGS. 2 and 5 by the chain 125 interconnected between the stand and a portion of the member 120 connected to the leg 36 of the tongue. Chain 125 has a hook 126 which provides a means for detachably holding the jack in retracted position. The jack is shown in dropped down operative position in FIG. 13. It will be noted that the jack has a flat base plate 128 which rests on the ground.

*Operation*

The operation of the lift mechanism can be seen readily from the diagrammatic views in FIGS. 9–12. In FIG. 9, the crusher rolls 50 and 51 are disposed in their lowermost operating position. A plane X through the axes of the rolls forms an acute angle Y with the ground on the material engaging sides of the rolls and the lower roll is spaced from the ground a distance Z. This is the best operating position of the rolls when the material being conditioned is light. The positions of the rolls are established by the adjusted position of sleeve 75 on the crank rod 71. Downward pivotal movement of the frame 20 relative to the tongue 30 is prevented by the stop 80 engaging the lever arm 76.

To elevate the conditioning rolls, for example from the position shown in FIG. 9 to the position in FIG. 10 the crank handle 74 is rotated to cause the sleeve 75 to move axially toward the handle. Such movement of this sleeve causes the lever arm 76 to pivot counter-clockwise causing the frame 20 and tongue 30 to pivot relative to each other about the axis of the member 28. The distance between the axis 24 of the wheels 25 and 26 of the implement and the axis 103 of the tractor wheels 102 is shortened by this pivoting action. This causes the wheels 25 and 26 to roll slightly and thereby move the conditioning mechanism toward the tractor and along the ground G. As can be seen, a vertical line B through the axis of the tractor wheel remains stationary. However, a vertical line A through the implement wheels shifts closer toward the line B.

When the lower roll is adjusted upwardly from the position shown in FIG. 9 to the position shown in FIG. 10 or to any intermediate position, the angle Y between the plane X and the ground increases, as well as the distance Z between the lower roll and the ground. This dual adjustment is important to proper operation of the machine in different field and operating conditions. The linkage structure is such that the greater the spacing between the lower roll and the ground, the greater the angle between the plane X and the ground.

FIG. 11 shows the structure adjusted to maximum elevated position. Such a high position is used for road transport of the implement. To lower the crushing or conditioning rolls from the position shown in FIG. 11 toward the position shown in FIG. 9, the crank handle 74 is rotated in a direction opposite to that used in raising the rolls to thereby slide sleeve 75 axially downwardly toward the pivotal connection 72. The scissors action of the frame thus produced causes the implement wheels to roll rearwardly a slight amount to thereby increase the space between the vertical line A and the vertical line B of the implement and the tractor, respectively.

The crank handle 74 is primarily adapted to be used by the operator to establish the lower limit of operation of the roll 50. When the machine is being used in the field, a change in field conditions may require a quick elevation of the conditioning rolls. For example, the operator may sight a stone or other obstruction and wish to pass over it without having the lower roll 50 engage it. If the crank means 74 was the only means provided for raising the rolls, the operator would have to leave the tractor and go back and use the crank handle to raise the rolls, then climb on the tractor, pass over the object and then go back and lower the rolls again. Obviously, this would be too time-consuming to be practical. Therefore, the hydraulic cylinder 82 is provided and is connected to the plate 91 carried on the cross member 28 through the lever arm 89 connected between plate 91 and the piston rod 86 of the hydraulic cylinder. By using the hydraulic mechanism, the operator can swing the frame structure from the position shown in FIG. 9 to the position shown in FIG. 12 and return to the position of FIG. 9 very rapidly. Moreover he can do this without having to adjust or otherwise change the position of the handle 74. The mechanism is free to elevate since the movement of the frame 20 and tongue 30 relative to each other upon actuation of the hydraulic mechanism causes the stop 80 on plate 79 to move away from the lever 76. Thereafter when the obstacle has been passed over actuation of the hydraulic cylinder withdrawing the piston rod 86 will cause the crop treating and conditioning rolls to return to their operating positions as regulated by the engagement of stop 80 on the plate 79 with lever 76. Since the position of lever 76 is established by crank handle 74, such constitutes the means for setting the lower limit of downward adjustment of the rolls.

With the above structure, the single adjustment of the frame 20 and tongue 30 by pivoting these members relative to each other about the axis of the cross member 28 performs two functions simultaneously. The lower roll is elevated relative to the ground to vary the space Z and simultaneously the angle Y between the plane X and the ground is varied.

Although the structure described has primary utility in controlling the elevated position of the conditioning members, it can also be used in regulating the height of the hitch member 31 when it is dresired to connect the implement to the drawbar 34 of the tractor. With the implement disconnected and the jack stand on the ground as shown in FIG. 13, by rotating the crank handle 74, frame 20 and tongue 30 will be pivoted relative to each other. As shown, this will cause the tongue to swing about the point where the jack stand 124 engages the ground and thereby raise or lower the hitch member 31 depending on the direction of rotation of the crank 74. Through this means, the hitch member can be set at proper elevation relative to the ground so that when the tractor T is backed up to the implement, the drawbar 34 can be readily passed into the hitch 31 so that the hitch pin 35 can be dropped into place. Once a hitching has taken place and the forward end of the tongue is supported on the drawbar as shown in FIG. 1, the crank 74 can be used to pivot the frame 20 and tongue 30 further relative to each other to lift the jack stand from the ground so that the stand can be swung upwardly to inoperative position and the chain 125 connected to the tongue to hold the stand retracted. Thus, the structure described, in addition to raising and lowering the lower roll and changing the angle of incidence between the rolls and the ground, also performs the function of regulating the height of the hitch so that it can be readily connected to the drawbar of the vehicle adapted to tow the implement.

While this invention has been described in connection with a particular embodiment thereof, it will be understood that it is capable of further modification, and this application is intended to cover any variations, uses or adaptations, of the invention following, in general, the principles of the invention and including such departures from the present disclosure as come within known or customary practice in the art to which the invention pertains and as fall within the scope of the invention or the limits of the appended claims.

Having thus described our invention, what we claim is:

1. In agricultural machinery, a mobile implement frame having a forward end and a rear end, a pair of crop treating rolls mounted one above the other on said frame and extending transverse to the direction of travel of the frame, said rolls having axes a plane through which forms an acute angle with the ground on the material engaging sides of the rolls, means pivotally supporting said rear end of said frame, a tongue having a forward end and a rear end, means pivotally supporting said forward end of said tongue, means pivotally connecting the forward end of said frame to the rear end of said tongue, and adjustment means operatively interconnected between said frame and tongue for pivoting the frame and tongue relative to each other about said pivotal connection means whereby said other roll may be vertically adjusted relative to the ground and said acute angle may be varied at the same time, said adjustment means including lost-motion connecting means limiting pivoting of said frame and tongue in one direction and permitting free pivoting of the frame and tongue in the opposite direction.

2. In agricultural machinery as recited in claim 1 wherein said means pivotally supporting said frame comprises a pair of wheels interposed between the frame and the ground.

3. In agricultural machinery as recited in claim 1 wherein said implement frame is adapted to be towed by a power vehicle, said means pivotally supporting said forward end of said tongue comprising a pivotal connection between a hitch member on said tongue and a drawbar on said power vehicle.

4. In agricultural machinery as recited in claim 1 wherein said means for pivotally connecting said frame and said tongue comprises a cross-member providing a generally horizontal axis about which the frame and tongue are pivotal.

5. In agricultural machinery as recited in claim 4 wherein said adjustment means also includes a rotatable crank rod and a movable lever arm, and said lost-motion connecting means connects said lever arm to said crank rod whereby when the crank rod is rotated said lever arm is moved relative thereto.

6. In agricultural machinery as recited in claim 5 wherein said crank rod has an end pivotally and rotatably supported on said tongue and an opposite end to which a rotatable force can be applied.

7. In agricultural machinery as recited in claim 5 wherein said crank rod is threaded and said lever arm has a sleeve at one end threaded onto the crank rod, said sleeve being movable axially of the crank rod when the crank rod is rotated.

8. In agricultural machinery as recited in claim 1 wherein in addition to said adjustment means said frame and tongue are interconnected by hydraulic means for pivoting the frame and tongue in said opposite direction.

9. In agricultural machinery as recited in claim 5 wherein said lost motion means comprises a first plate connected to said cross member and extending radially therefrom and a stop member on said plate engageable with said lever arm.

10. In agricultural machinery as recited in claim 9 wherein hydraulic means is connected to said cross-member independently of said crank rod whereby the hydraulic means may be used to pivot said frame and said tongue relative to each other, said stop member limiting pivotal movement in one direction.

11. In agricultural machinery as recited in claim 10 wherein said hydraulic means is connected between said tongue and a second plate on said cross-member, said second plate being connected to said cross-member in angular alignment with said first plate.

12. In agricultural machinery as recited in claim 1 wherein a jack stand is connected to said tongue between said forward and rear ends thereof and interposable between the tongue and the ground whereby the tongue may be pivoted on operation of said interconnected means to vary the height of the tongue forward end from the ground.

References Cited in the file of this patent

UNITED STATES PATENTS

| | | |
|---|---|---|
| 2,911,780 | Brady | Nov. 10, 1959 |
| 2,932,143 | Morkoski | Apr. 12, 1960 |
| 2,947,129 | Kowalik | Aug. 2, 1960 |